(12) United States Patent
Richter et al.

(10) Patent No.: US 7,106,687 B1
(45) Date of Patent: Sep. 12, 2006

(54) OPTICAL RECORDING MEDIUM HAVING AT LEAST TWO RECORDABLE LAYERS

(75) Inventors: Hartmut Richter, Villingen-Schwenningen (DE); Dietmar Uhde, Königsfeld (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 459 days.

(21) Appl. No.: 09/575,080

(22) Filed: May 19, 2000

(30) Foreign Application Priority Data

May 21, 1999 (DE) .............................. 199 23 542

(51) Int. Cl.
*G11B 7/24* (2006.01)
(52) U.S. Cl. .................................. 369/286; 369/283
(58) Field of Classification Search ............. 369/275.1, 369/275.2, 286
See application file for complete search history.

(56) References Cited

U.S. PATENT DOCUMENTS

| | | | |
|---|---|---|---|
| 5,563,873 A | 10/1996 | Ito et al. ...................... 369/286 |
| 5,703,868 A | 12/1997 | Kobayashi et al. ......... 369/286 |
| 5,726,970 A * | 3/1998 | Kaneko et al. ........... 369/275.2 |
| 5,761,188 A * | 6/1998 | Rosen et al. ............. 369/275.2 |
| 5,766,717 A * | 6/1998 | Kaneko et al. ............. 428/64.1 |
| 5,841,861 A * | 11/1998 | Kondo et al. .................. 705/57 |
| 5,862,121 A | 1/1999 | Suzuki .................... 369/275.1 |
| 5,876,823 A | 3/1999 | Nagashima ................ 428/64.1 |
| 5,878,018 A * | 3/1999 | Moriya et al. ........... 369/275.1 |
| 6,014,364 A * | 1/2000 | Takasu et al. ............ 369/275.1 |
| 6,030,678 A * | 2/2000 | Aratani ...................... 428/64.1 |
| 6,031,813 A * | 2/2000 | Moriya et al. ........... 369/275.1 |
| 6,219,330 B1 * | 4/2001 | Ahn et al. ................ 369/275.1 |
| 6,270,611 B1 * | 8/2001 | Ohki et al. .................. 156/220 |
| 6,343,060 B1 * | 1/2002 | Ko ........................... 369/275.1 |
| 6,434,107 B1 * | 8/2002 | Artigalas et al. ........ 369/275.1 |

FOREIGN PATENT DOCUMENTS

EP 0706178 5/2001

* cited by examiner

*Primary Examiner*—Brian E. Miller
(74) *Attorney, Agent, or Firm*—Joseph J. Laks; Harvey D. Fried; Patricia Verlangieri

(57) ABSTRACT

An optical recording medium having at least two information carrier layers, on which information can be written by means of a focused light beam. In the present invention, a separating layer is arranged between the information carrier layers and a respective transparent covering layer is arranged between the information carrier layer and the surface of the recording medium, the thickness of each transparent covering layer substantially exceeds that of the respective information carrier layer. One object of the present invention is to propose an optical recording medium in the which it is possible to write to both information carrier layers using a low optical power. Further objects of the invention are to specify an apparatus and also a suitable method for writing to recording medium according to the present invention. A recording medium according to the invention has information carrier layers which are both semi-transparent.

6 Claims, 2 Drawing Sheets

OPTICAL RECORDING MEDIUM HAVING AT LEAST TWO RECORDABLE LAYERS

FIELD OF THE INVENTION

The present invention relates to a writable optical recording medium having a plurality of information carrier layers, to an apparatus for writing to a recording medium of this type, and to a writing method.

BACKGROUND OF THE INVENTION

An optical recording medium having two information carrier layers, on which information can be written by means of a focused light beam, is disclosed in EP-A2-0 706 178. In the case of the known recording medium, a separating layer is arranged between the information carrier layers and a transparent covering layer is arranged between the information carrier layer and the surface of the recording medium. The thickness of the transparent covering layer substantially exceeds that of the information carrier layer, which means that dirt or scratches on the surface of the recording medium do not result in any disruption, or result only in slight disruption, during the writing process or the read-out process. The thicker the covering layer, the greater the diameter of the scanning light beam at the level of the surface; concealment by dirt or impairment by scratches thus affects only a small part of the light beam. Both information carrier layers can be read from or written to from one side of the recording medium. In this case, the light beam passes through the upper of the information carrier layers. The known recording medium may be regarded as having the disadvantage that, for recording on the lower information carrier layer, the light beam must pass through the upper information carrier layer. The consequence of this is that only a small proportion of the optical power reaches as far as the lower information carrier layer. In order to provide the power necessary for the writing operation, the light beam falling onto the recording medium must already have an appropriate intensity. On the one hand, this has an adverse effect on the light source, whose service life may be shortened as a result, or whose production costs, because of the increased requirements, are higher than is tolerable for mass-produced products. On the other hand, a high power density in the light beam can cause the upper information carrier layer to be impaired. Designing the lower information carrier layer such that it is more sensitive, so that it can actually be written to using a lower optical power, again increases the complexity and hence the price of the recording medium.

SUMMARY OF THE INVENTION

One object of the present invention is to propose an optical recording medium which eliminates the disadvantages of the prior art. Further objects of the invention are to specify an apparatus and also a suitable method for writing to a recording medium of this type.

In a recording medium of the generic type, the invention provides for both information carrier layers to be designed to be semi-transparent. This has the advantage that both information carrier layers are accessible to the light beam from both sides of the recording medium. Consequently, both information carrier layers can be read from a single side of the recording medium, while writing to the recording medium necessitates writing in each case only to the information carrier layer nearest the surface. The light beam used for recording therefore only has to pass through the transparent covering layer, but not one of the only slightly transparent information carrier layers. A lower power of the light source which generates the light beam is sufficient, therefore, for recording. A further advantage is that when one information carrier layer is being written to, the respective other information carrier layer cannot be impaired by a high energy density of the light beam used for recording, since the said light beam does not radiate through the respective other information carrier layer.

The invention provides for both information carrier layers to be able to be read from both sides of the recording medium, but to be able to be written to only one side in each case. In other words, the information carrier layers can be written to only from the side which is remote from the respective other information carrier layer, in other words from the outer side of the information carrier. This has the advantage that the layer on the side to be written is optimally matched in respect of recording; for example it has a particularly low reflection and transmission rate but a high absorption rate. On the other side of the information carrier layer, the side which is not suitable for a writing process, the said layer then has a particularly low absorption rate and a particularly high reflectivity. It is thus possible to write to the information carrier layer using a low optical power, and the optical power for writing and that for reading may be approximately of the same order of magnitude, which affords the further advantage that the light source for generating the light beam is loaded relatively uniformly, as a result of which its service life is increased.

The invention provides for the total transmission factor of an information carrier layer with associated separating layer to be too low to allow a light intensity which suffices for a writing operation to pass to the other information carrier layer. This has the advantage of preventing the information carrier layers from being written to from the side that is not intended for that purpose, that is to say through the other information carrier layer.

A development of the recording medium according to the invention provides for the separating layer to have at least one further information carrier layer. This may be either one or a plurality of read-only information carrier layers; however, one or a plurality of writable information carrier layers which can be written to from the respective nearer surface of the recording medium also lie within the scope of the invention. This has the advantage that the total capacity of the recording medium is increased.

In thermo-optical methods it is advantageous for the transmission and reflectivity to be low. According to a variant of the invention, the transmission factor of the information carrier layers, given the use of two information carrier layers per recording medium, assumes a value of less than 10%.

In addition to information carrier layers that can be written to and overwritten many times, a recording medium according to the invention advantageously has write-once information carrier layers, so-called write-once read-many layers (WORM), or else other types of information carrier layers. Such layers are especially suitable for permanent documentation, in particular, since inadvertent overwriting is precluded.

The invention provides for each writable information carrier layer of the recording medium to have a preformatted track, the rotational sense of the preformatted tracks being unidirectional for each layer, while the directional sense of the preformatted tracks is unidirectional or else in opposite directions. This has the advantage that the tracking is predetermined, as a result of which the recording is facilitated since the information carrier layers do not also have to be "tracked" the first time that writing is effected. The orientation along the predetermined track in the event of writing is given, which is especially advantageous in particular during the writing of the track which is to be read from the other side and has to be written backwards, as it were. If the preformatted tracks of the two information carrier layers have an opposed directional sense, then an uninterrupted transition from the end of the track of one information carrier layer to the beginning of the track of the other information carrier layer is ensured in the course of reproduction. This is desirable in particular during the reproduction of audio or video recordings, and also during the recording thereof. An opposed directional sense means, for example, that one track is a spiral running from the inner part outwards, while the other track is a spiral running from the radially outer part radially inwards. Correspondingly unidirectional tracks are expedient in particular when the recording medium is used as a data store. In the course of the data reproduction, data located on different layers can then be accessed without difficulty, without incurring relatively long transition times.

A first apparatus according to the invention for reading from and/or writing to optical recording media according to the invention has a light source, whose maximum power is sufficiently low that a writable information carrier layer cannot be illuminated through a semi-transparent information carrier layer with power that is sufficient for a writing operation. This has the advantage that it is possible to use a relatively low-power light source, which is inexpensive to produce and saves energy during operation. The required components can essentially be adopted from conventional apparatuses for writing to single-layer recording media; a complicated new construction is not necessary.

Another apparatus according to the invention advantageously has a buffer memory for data to be recorded, from which a control unit reads out data in reverse order in order to output a corresponding recording signal to the light source. In this case, by way of example, data are taken in reverse order from the buffer memory in an amount that suffices to effect recording during one or a specific number of revolutions. Once these data have been written, the writing beam jumps back by an appropriately increased number of tracks of the recording medium in order, at that point, to start recording the next data present in reverse order. This has the advantage that data of the information carrier layer which is to be read through the other information carrier layer are brought into reverse order for recording from the side opposite to the read-out side. They are then present in the correct order for read-out, which takes place from the other side; resorting for reproduction is no longer necessary in that case. The data are fetched from the memory piece by piece, as it were, but are recorded, in a manner staggered over time, "in one piece".

An apparatus according to the invention advantageously has a control unit, which assigns data that are to be recorded on the information carrier layer located on the side remote from the light source firstly to a specific area of the other information carrier layer, for recording. After the recording medium has been turned over, the control unit drives a scanner of the apparatus for the purpose of reading out the data recorded in the specific area, in order to assign the said data to areas on the other information carrier layer which is then facing the light source, for recording. This has the advantage that it is possible to write to the recording medium in as uninterrupted a manner as possible, even if data are to be recorded on different information carrier layers, of which only one is accessible directly, and the other only after the recording medium has been turned over, for recording. After the recording medium has been turned over, the data buffer-stored in the specific area of the first information carrier layer are then transferred to those areas of the second information carrier layer which are assigned to them. With an apparatus of this type, the recording medium is utilized as a data carrier with a pseudo-ROM layer. In that case, without the recording medium being turned over, the information carrier layer remote from the light source is a read-only, so-called ROM layer, which, however, can nonetheless be utilized as a random-access or RAM layer by way of the detour of buffer-storage on the first information carrier layer.

A system for writing to and reading from optical recording media has an apparatus according to the invention and a recording medium according to the invention.

A method according to the invention for writing to a multilayer optical recording medium that can be read on one side is distinguished by the fact that the operation of writing to at least one information carrier layer of the recording medium takes place from the side opposite to the read-out side. This has the advantages, already described above, of the lower optical power required, and of lesser impediment of the upper layer when the lower layer is being written to.

An advantageous variant of the method according to the invention envisages that, in order to write to an information carrier layer from that side of the recording medium which is opposite to the read-out side, the direction of movement of the recording medium is reversed in comparison with the direction of movement during read-out. This has the advantage that the recorded data are present in the correct order for reproduction when they are read out, this read-out taking place with the opposite rotational sense.

Another refinement of the method according to the invention provides for the data to be recorded to be buffer-stored and taken from the buffer memory in reverse order for recording. This has the advantage that, without the need for a change in the rotational sense, the data are recorded in a correct order for read-out.

According to a further variant of the invention, the order of the data is advantageously reversed during read-out. Preferably a certain amount of data is read from the disk and is reversed before the next amount of data is read and reversed. This amount e.g. corresponds to a certain number of rotations fo the recording medium or to a certain distance on a track of the recording medium or to a certain playback time or to other appropriate divisions. This has the advantage that a reversal is not necessary for the recording operation, this being advantageous in particular in the case of complex processing steps that are necessary prior to the recording process, for example data compression in accordance with one of the methods which are known by the name of MPEG. Such methods sometimes require a large storage capacity, which is then not available for reversing the order of the data to be recorded. A recording medium that has been written to in a corresponding manner cannot then be read by apparatuses which expect recordings in the prescribed reading direction. Therefore, this method can advantageously be used as a possibility for providing protection against copying and/or read protection.

Further advantages of the invention are specified in the following description of advantageous embodiments of the invention. It goes without saying that the invention is not restricted just to these exemplary embodiments, rather other variants within the scope of expert abilities are also included as well.

DETAILED DESCRIPTION OF PREFERED EMBODIMENTS

Figure 1:
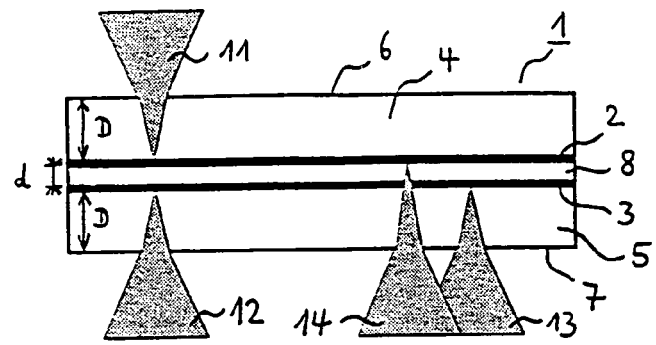
FIG. 1 shows an optical recording medium according to the invention.

FIG. 1 shows a partial cross section through an optical recording medium 1 having two information carrier layers 2, 3. The latter are each covered by a covering layer 4, 5, which reaches as far as the respective surface 6, 7 of the recording medium 1. A separating layer 8 is arranged between the first information carrier layer 2 and the second information carrier layer 3. Like the covering layers 4, 5, the separating layer 8 is designed to be transparent. In contrast to the covering layers 4, 5, whose thickness is a multiple of the thickness of the information carrier layers 2, 3, the separating layer 8 is designed to be relatively thin; its thickness is typically of the order of magnitude of d=50 µm. The thickness of the information carrier layers 2, 3 is approximately of the order of magnitude of $d_i \approx 1$ µm, where the actual layer that carries the information may perfectly well have a thickness of just 30–100 nm. The thickness of the covering layers 4, 5 is approximately D=6000 µm. A first light beam 11 falls onto the recording medium from above, is refracted at the first surface 6, passes through the first covering layer 4 and is focused onto the first information carrier layer 2. A second light beam 12 falls onto the recording medium from below, is refracted at the second surface 7, passes through the second covering layer 5 and is focused onto the second information carrier layer 3. The light beams 11, 12 are light beams used for recording. They traverse only a covering layer 4, 5 having the thickness D and, in the process, their intensity is attenuated only weakly. The light beams 11–14 are depicted simultaneously for illustration purposes, but in general only one of the light beams 11–14 scans the recording medium 1.

A third light beam 13 is portrayed on the right-hand side, and, like the second light beam 12, is focused onto the second information carrier layer 3. A further, fourth light beam 14 likewise falls onto the recording medium from below, is refracted at the second surface 7, passes through the second covering layer 5, but is not yet focused at the level of the second information carrier layer 3. It traverses the second information carrier layer 3, which is semi-transparent according to the invention, likewise traverses the separating layer 8 and is focused onto the first information carrier layer 2. The third and fourth light beams 13, 14 are used for read-out; they have a lower intensity than the light beams 11, 12 used for writing. The fourth light beam 14 preferably has a higher intensity than the third light beam 13, since its intensity is reduced when traversing the second information carrier layer 3 and the separating layer 8.

The information carrier layers 2, 3 have a relatively high absorption factor. In the course of writing by means of the light beam 11 and 12, respectively, a large portion of the light energy is thus absorbed by the information carrier layer 2, 3, which changes its structure in the process. In the case of an information carrier layer 2, 3 which operates according to the so-called phase change method, a phase transition occurs in the material forming the information carrier layer 2, 3 from amorphous to crystalline, or vice versa. In other methods, too, the energy absorbed by the information carrier layer 2, 3 serves to convert the structure, which is detected subsequently in the course of reading. According to the invention, the information carrier layers 2, 3 are semi-transparent, that is to say their transmission factor is greater than zero. Therefore, it is possible to read the other information carrier layer 2, 3 through one information carrier layer 3, 2. On account of the high absorption factor of the information carrier layers 2, 3, the light energy that is usually available for writing does not suffice, however, for writing to the other information carrier layer 2 through one information carrier layer 3. Therefore, this information carrier layer 2 is written to from the opposite side of the recording medium 1.

Figure 2:
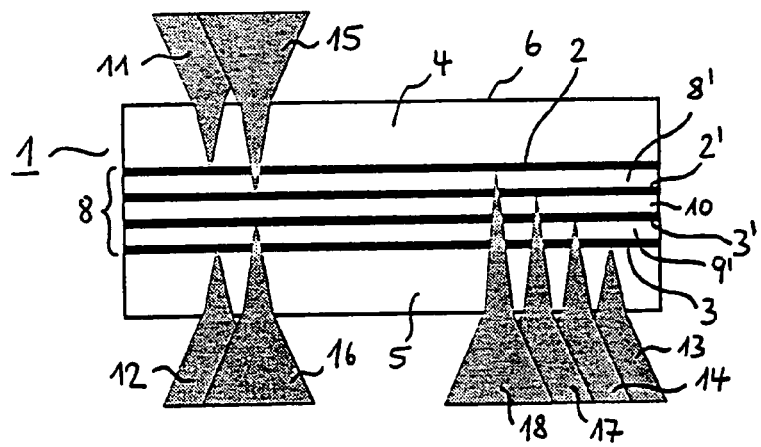
FIG. 2 shows a further embodiment of an optical recording medium according to the invention.

FIG. 2 shows a further embodiment of an optical recording medium 1 according to the invention. In this case, the separating layer 8 comprises a central, transparent separating layer 10 on which information carrier layers 2', 3' are arranged on both sides, a transparent separating layer 8', 9' in each case being superposed on the said information carrier layers. This is followed, as disclosed in FIG. 1, by the first information carrier layer 2 and the first covering layer 4 in the upward direction, while the second information carrier layer 3 and the second covering layer 5 follow in the downward direction. In addition to the first light beam 11, a further light beam 15, which is incident from above like the light beam 11, is used to write to the third information carrier layer 2'. The fourth information carrier layer 3' is written to by the light beam 16, which falls onto the recording medium 1 from below like the second light beam 12. In this case, in addition to passing through the covering layer 4, the light beams 15, 16 also pass through the information carrier layer 2 and 3, respectively, and the corresponding separating layer 8', 9'.

Absorption and transmission factors of the information carrier layers 2, 2', 3, 3' are designed appropriately. For a read-out process, use is made not only of the light beams 13, 14 already disclosed in FIG. 1, but also of the light beams 17, 18, which are likewise incident from below. In this case, the light beams 17, 18 traverse two and, respectively, three information carrier layers and the same number of separating layers until they are focused on the information carrier layer 2' and 2, respectively, to be read by them. The optical power for generating the light beams 14, 17, 18 and the transmission and absorption factors of the information carrier layers 2, 2', 3, 3' are adapted appropriately.

The available power of the light source 24 (not illustrated in this figure) which generates the light beams 11–18 is generally limited. The transmission properties of the information carrier layers 2, 2', 3, 3' are also limited for physical reasons. Therefore, only a certain number of information carrier layers 2, 2', 3, 3' are written to from one side, two layers in the example of FIG. 2. In order nonetheless to be able to write to a multilayer, rewritable recording medium 1 with a moderate light source power, the layers 2, 2' are written to from one side of the recording medium 1, while the layers 3, 3' are written to from the opposite side. On account of the semi-transparency of the information carrier layers 2, 2', 3, 3', however, it is possible to read all the information carrier layers 2, 2', 3, 3' from a single side of the recording medium 1. According to one variant of the invention, the third and fourth information carrier layers 2', 3' are designed as write-once layers.

Figure 3:
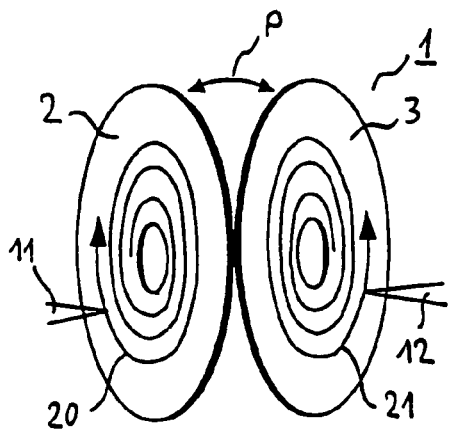
FIG. 3 shows an optical recording medium with a pre-formatted track according to a first embodiment.

FIG. 3 shows an optical recording medium 1 with a preformatted track according to a first embodiment, in a diagrammatic illustration. In this case, the information carrier layers 2, 3 are shown folded out from one another, this being indicated by the arrow P. The separating layer 8 and the covering layer 4, 5 are not illustrated, for the sake of simplicity. The writing beams 11 and 12 are likewise indicated diagrammatically. They are focused onto a preformatted track 20 and 21, respectively. The preformatted tracks 20, 21 constitute spirals which run from the radially inner part radially outwards and have the same rotational sense and the same directional sense. Both tracks 20, 21 are written to from the radially inner part radially outwards. During the recording of data, the recording medium 1 rotates in opposite directions for both sides; during read-out, which takes place from the right-hand side in the figure, the direction of rotation is the same for both sides. During production, the covering layers 4, 5, which are not illustrated here for the sake of clarity, serve as a substrate on which the preformatted track 20, 21 is applied. In this case, the preformatted tracks 20, 21 are arranged in a mirror-inverted manner with respect to one another. The covering layers 4, 5 provided with the preformatted track 20, 21 are connected to one another by means of the separating layer 8, which is likewise not illustrated separately here. The direction of the track is determined for example by means of information items stored on the track wherein these information items have a direction defining property. For example these information items consist of increasing numbers starting at a minimum value at the beginning of the track and ending at a maximum value at the end of the track. The information items may also be an indication of playing time, of distance or any other appropriate property.

Figure 4:
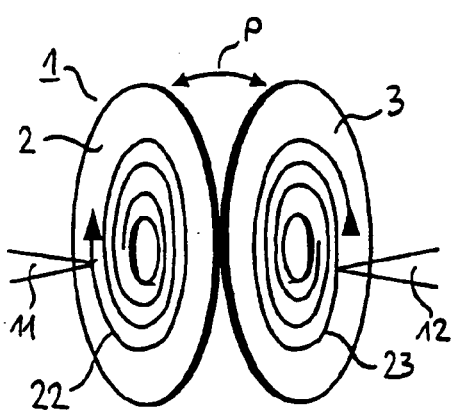
FIG. 4 shows an optical recording medium with a pre-formatted track according to a second embodiment.

FIG. 4 shows a further recording medium with a preformatted track according to a second embodiment. The recording medium 1 is illustrated diagrammatically in a manner corresponding to FIG. 3; identical reference symbols designate identical elements. The rotational sense of the preformatted tracks 22, 23 is the same in this case, too. The track 22 of the first information carrier layer 2 is, however, written to from the radially inner part outwards, and the track 23 of the information carrier layer 3 is written to from the outer part inwards. During the recording of data, the recording medium 1 again has opposite directions of rotation for both sides; during read-out, the direction of rotation is the same. The advantage of this embodiment is that the scanner has to change the focusing of the light beam for continuous reproduction merely from one information carrier layer 2 to the other information carrier layer 3.

In comparison with customary apparatuses, the optical recording media according to the invention are written to using a normal light-source power, even though there are a number of information carrier layers 2, 3', 3, 3'. As the light source 24, it is possible to use commercially available lasers, for example laser diodes, with a relatively high power for standard apparatuses, which reduces the costs for corresponding apparatuses. All the information carrier layers 2, 2', 3, 3' of the recording medium 1 are read from a single side, thereby reducing the access time to the stored information. In contrast to recording media whose information carrier layers 2, 3 are both written to from the same side, there is greater freedom in the choice of reflection, absorption and transmission properties of the information carrier layers 2, 3 in the case of the optical recording medium according to the invention. In this case, all that is necessary is that the recording medium 1 be turned over in order to write to the respective other information carrier layer 3, 2. In this case, however, it is also possible to choose a scanner which moves around the recording medium 1.

Figure 5:
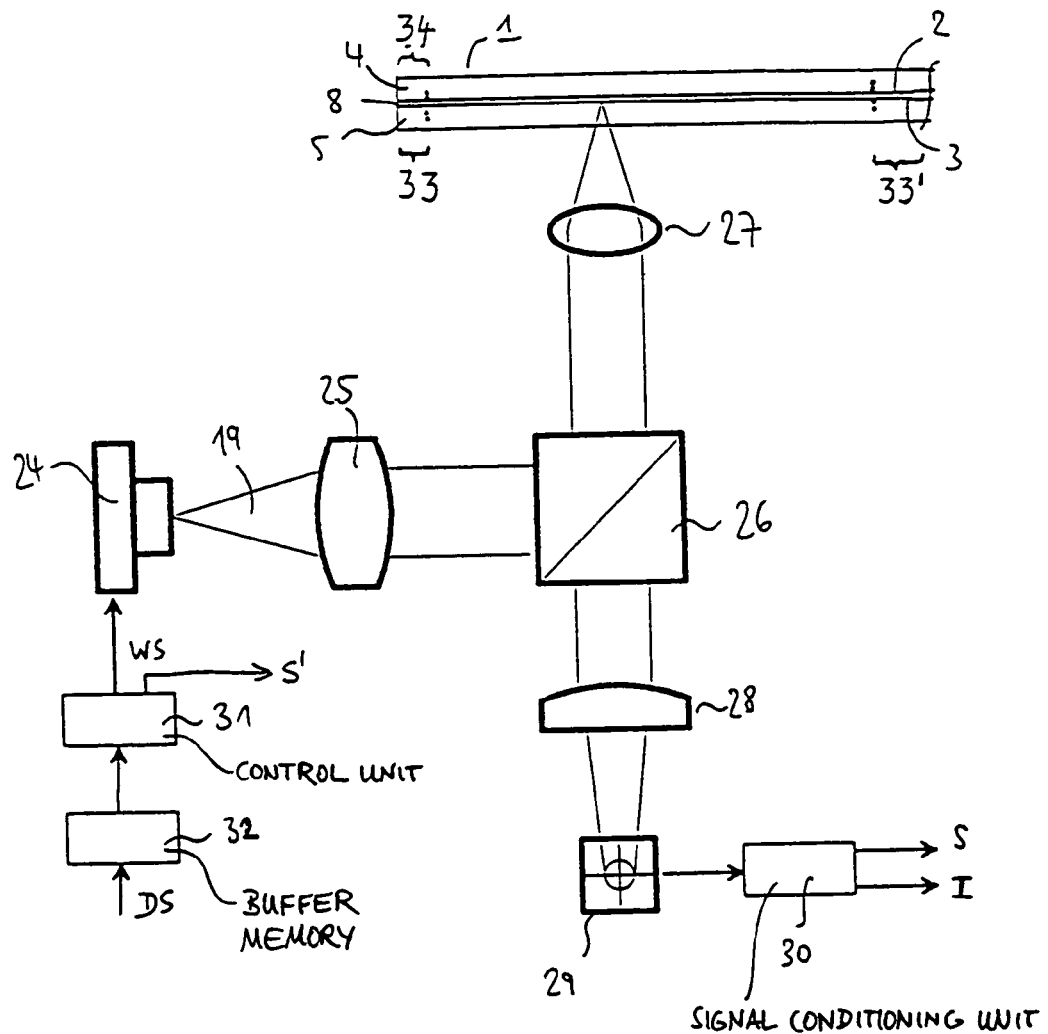
FIG. 5 shows part of an apparatus according to the invention.

FIG. 5 diagrammatically shows an apparatus according to the invention. A light source 24 generates a light beam 19, which is concentrated by means of a converging lens 25 and is deflected in the direction of the recording medium 1 by a beam splitter 26. The light beam is focused onto the second information carrier layer 3 by an objective lens 27. It is reflected from the said information carrier layer, passes through the objective lens 27, the beam splitter 26 and a further converging lens 28 and falls onto a detector 29, which is shown tilted through 90° towards the observer here. The output signals of the detector 29 are fed to a signal conditioning unit 30, which feeds servo signals S to regulating circuits for regulating the tracking, for focusing and, if appropriate, to further regulating circuits, and emits an information signal I for outputting.

According to a first embodiment, the light source 24 has a maximum output power which is too low to illuminate a writable information carrier layer 2, 3 through the respective other semi-transparent information carrier layer 3, 2 with sufficient power for a writing operation.

For recording, the power of the light source 24 is varied in accordance with a write signal WS, in order to change the property of correspondingly extended areas along the tracks 20, 21, 22, 23. In this case, the write signal WS is provided by a control unit 31, to which the data signal DS to be recorded is fed directly or indirectly. In accordance with a further variant of the invention, to that end a buffer memory 32 is provided, in which the data signal DS is buffer-stored, and is read out in reverse order by the control unit 31 and fed to the light source 24 as write signal WS. In accordance with a further variant of the invention, the control unit 31 outputs control signals S' for selecting specific areas of the information carrier layer 2, 3. Data that are to be recorded on the information layer 2 remote from the light source 24 are firstly recorded in a specific area 33 of the information carrier layer 3. After the recording medium 1 has been turned over, the control unit 31 firstly causes the apparatus to read out data stored in the area 33 and to buffer-store them, for example in the buffer memory 32. The control unit 31 then feeds these data to the light source 24 as write signal WS for the purpose of recording. In this case, on account of the control signals S' output by the control unit 31, the light beam 19 is moved to the positions provided for the respective data.

A buffer-storage area 34 on the other information carrier layer 2 corresponds to the buffer-storage area 33 on the information carrier layer 3. It is illustrated here only by way of example on the left-hand, that is to say on the radially outer edge of the recording medium 1. It may likewise be arranged on the inner area 33' or in the intervening area. Division into a plurality of buffer-storage areas which are arranged at radially different locations or can be displaced flexibly also lies within the scope of the invention.

The optical storage density of optical recording media is generally limited by the aperture NA of the objective lens 27 and the wavelength of the light generated by the light source 24. In this case, the following holds true for the half-value width, also called full width half maximum: FWHM≈0.59*λ/NA. In contrast to magnetic data recording on tape, optical data recording on recording media 1 in the form of discs is limited by the finite size of the surface area. One possible way of increasing the capacity for a predetermined light wavelength λ, numerical aperture NA and an unchanged geometry of the recording medium 1 is to store data in a plurality of semi-transparent information layers lying one above the other. This insight is already taken into account for example in the case of the so-called DVD-ROM with so-called dual-layer discs. In this case, the upper of two information carrier layers is semi-transparent, while the lower layer is non-transparent. Data are written to optical recording media thermo-optically, for example. In this case, the information carrier layer is heated locally by relatively high laser power, in order to write a magnetic domain or a phase domain. In the case of a rewritable, two-layer recording medium, the frontal information layer 3 is designed to reflect and absorb light, with the result that only a small percentage of the laser power penetrates through to the information layer 2 located behind it. A powerful and costly laser source is thus required. The invention relates, inter alia, to a two-layer, rewritable recording medium which operates according to the magneto-optical or phase-change method, with the properties that the information carrier layer 2 can be written to from the side of the surface 6 and the information carrier layer 3 can be written to from the side of the surface 7, and that both information carrier layers 2, 3 can be read from both sides. This is achieved by means of the special construction of the information carrier layers 2, 3. They absorb a specific proportion of the light in order to achieve the heating which is required for recording, and they reflect and transmit a certain portion of the light that falls onto them for the read-out. The information carrier layers 2, 3 can each be written to from the side which faces the substrate, the covering layer 4, 5, and can be read from both sides. The data are written directly, that is to say from both sides of the recording medium 1, without the absorption of light by a frontal information carrier layer. Less optical power is needed, therefore, for the writing operation. It is thus possible essentially to use a commercially available optical drive for recording data. The user only has to turn the recording medium 1 over for complete writing, or the scanner moves around the said recording medium. However, both information carrier layers 2, 3 can be read from both sides, on account of a specific transparency. The user can therefore read both information carrier layers of the recording medium directly, after the recording process, without having to turn the said recording medium or without requiring an expensive drive in which the scanner moves around the disc. Consequently, the entire contents are always available for reading.

What is claimed is:

1. Optical recording medium comprising at least two information carrier layers, on which information can be written by means of a focused light beam, a separating layer arranged between said information carrier layers, and a transparent covering layer, which is arranged between said information carrier layer and a surface of the recording medium and whose thickness substantially exceeds that of said information carrier layer, wherein each information carrier layer is semi-transparent, and wherein each information carrier layer can be read from both sides, but can be written to from only one side in each case.

2. Optical recording medium according to claim 1, wherein the total transmission factor of an information carrier layer with associated covering layer and separating layer is lower than the lowest transmission factor that allows to pass through said information carrier layer with associated covering layer and separating layer a quantity of light being sufficient for a writing operation on the other information carrier layer.

3. Optical recording medium comprising two information carrier layers, on which information can be written by means of a focused light beam, a separating layer arranged between said information carrier layers, and a transparent covering layer, which is arranged between said information carrier layer and a surface of the recording medium and whose thickness substantially exceeds that of said information carrier layer, wherein both information carrier layers are semi-transparent, wherein the total transmission factor of an information carrier layer with associated covering layer and separating layer is lower than the lowest transmission factor that allows to pass through said information carrier layer with associated covering layer and separating layer a quantity of light being sufficient for a writing operation on the other information carrier layer.

4. Optical recording medium according to claim 3, wherein the transmission factor of each information carrier layer is less than 10%.

5. Optical recording medium comprising two information carrier layers, on which information can be written by means of a focused light beam, a separating layer arranged between said information carrier layers, and a transparent covering layer, which is arranged between said information carrier layer and a surface of the recording medium and whose thickness substantially exceeds that of said information carrier layer, wherein both information carrier layers are semi-transparent and wherein the transmission factor of each of said two information carrier layers is less than 10%.

6. Optical recording medium comprising at least two information carrier layers, on which information can be written by means of a focused light beam, a separating layer arranged between said information carrier layers, and a transparent covering layer, which is arranged between said information carrier layer and a surface of the recording medium and whose thickness substantially exceeds that of said information carrier layer, wherein each information carrier layer is semi-transparent, and wherein the writable information carrier layers have a preformatted track, the rotational sense of each track, viewed from the same side, is unidirectional, and whose directional sense is one of unidirectional and opposed.

* * * * *